US012568104B2

(12) United States Patent
Siekman et al.

(10) Patent No.: US 12,568,104 B2
(45) Date of Patent: Mar. 3, 2026

(54) SYSTEM AND METHOD FOR SYNTHETIC INTRUSION DATA GENERATION AND REMEDIATION VIA MACHINE LEARNING

(71) Applicant: BANK OF AMERICA CORPORATION, Charlotte, NC (US)

(72) Inventors: James Siekman, Charlotte, NC (US); Angela Smith, Charlotte, NC (US); Michael Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 38 days.

(21) Appl. No.: 18/794,051

(22) Filed: Aug. 5, 2024

(65) Prior Publication Data

US 2026/0039674 A1      Feb. 5, 2026

(51) Int. Cl.
*H04L 9/40*                    (2022.01)
(52) U.S. Cl.
CPC ...... *H04L 63/1425* (2013.01); *H04L 63/1441* (2013.01)
(58) Field of Classification Search
CPC ........................ H04L 63/1425; H04L 63/1441
See application file for complete search history.

(56) References Cited

U.S. PATENT DOCUMENTS

| | | | |
|---|---|---|---|
| 10,089,460 B2 | 10/2018 | Moon et al. | |
| 10,169,581 B2 | 1/2019 | Tsao et al. | |
| 10,503,903 B2 | 12/2019 | Pan et al. | |
| 11,403,711 B1 * | 8/2022 | Ross | G06Q 40/08 |
| 11,461,467 B2 | 10/2022 | Saffar et al. | |
| 11,609,991 B2 | 3/2023 | Saxe et al. | |
| 11,755,974 B2 | 9/2023 | Saxe et al. | |
| 11,790,079 B2 | 10/2023 | Salem et al. | |
| 11,803,641 B2 | 10/2023 | Paul et al. | |
| 11,818,165 B2 | 11/2023 | Levy | |
| 11,836,664 B2 | 12/2023 | Ackerman et al. | |
| 2018/0159871 A1 * | 6/2018 | Komashinskiy | H04L 63/1416 |

(Continued)

OTHER PUBLICATIONS

A. Kaddoura, S., "Classification of Malicious and Benign Websites by Network Features Using Supervised Machine Learning Algorithms", Oct. 2021, 5th Cyber Security in Networking Conference, pp. 36-40 (Year: 2021).*

(Continued)

*Primary Examiner* — Kenneth W Chang
(74) *Attorney, Agent, or Firm* — Moore & Van Allen PLLC; Andrew T. Wood

(57)                    ABSTRACT

Systems, computer program products, and methods are described herein for synthetic intrusion data generation and remediation via machine learning. The present disclosure includes training a first machine learning model using a plurality of malicious code segments from a code repository, generating, using the first machine learning model, a predetermined number of generated code segments, training a second machine learning model using the plurality of malicious code segments, generating, by using the second machine learning model, at least one generated heuristic mitigation resource for the generated code segments, analyzing, via a static heuristics analysis, stored code on an endpoint device, and applying the at least one generated heuristic mitigation resource upon a first condition wherein the static heuristics analysis identifies a malicious activity.

20 Claims, 6 Drawing Sheets

(56) References Cited

U.S. PATENT DOCUMENTS

| | | | |
|---|---|---|---|
| 2019/0260804 A1 * | 8/2019 | Beck | H04L 63/0428 |
| 2020/0167471 A1 * | 5/2020 | Rouhani | G06N 3/045 |
| 2021/0073377 A1 * | 3/2021 | Coull | G06N 3/045 |
| 2022/0269949 A1 * | 8/2022 | Scheideler | G06N 3/0475 |
| 2023/0161879 A1 | 5/2023 | Koo et al. | |
| 2023/0206131 A1 | 6/2023 | Brock | |
| 2023/0252136 A1 | 8/2023 | Kim | |
| 2023/0252144 A1 | 8/2023 | Kim | |
| 2023/0306112 A1 | 9/2023 | Jung et al. | |
| 2023/0342465 A1 * | 10/2023 | Sevcenko | G06F 21/565 |
| 2024/0039798 A1 * | 2/2024 | McDaniel | H04L 51/212 |
| 2024/0112115 A1 | 4/2024 | Ladnai et al. | |

OTHER PUBLICATIONS

B. Lourenco et al., "Malicious URLs and QR Code Classification using Machine Learning and Deep Learning Techniques", Aug. 2023, 3rd Asian Conference on Innovation in Technology, pp. 1-10 (Year: 2023).*

* cited by examiner

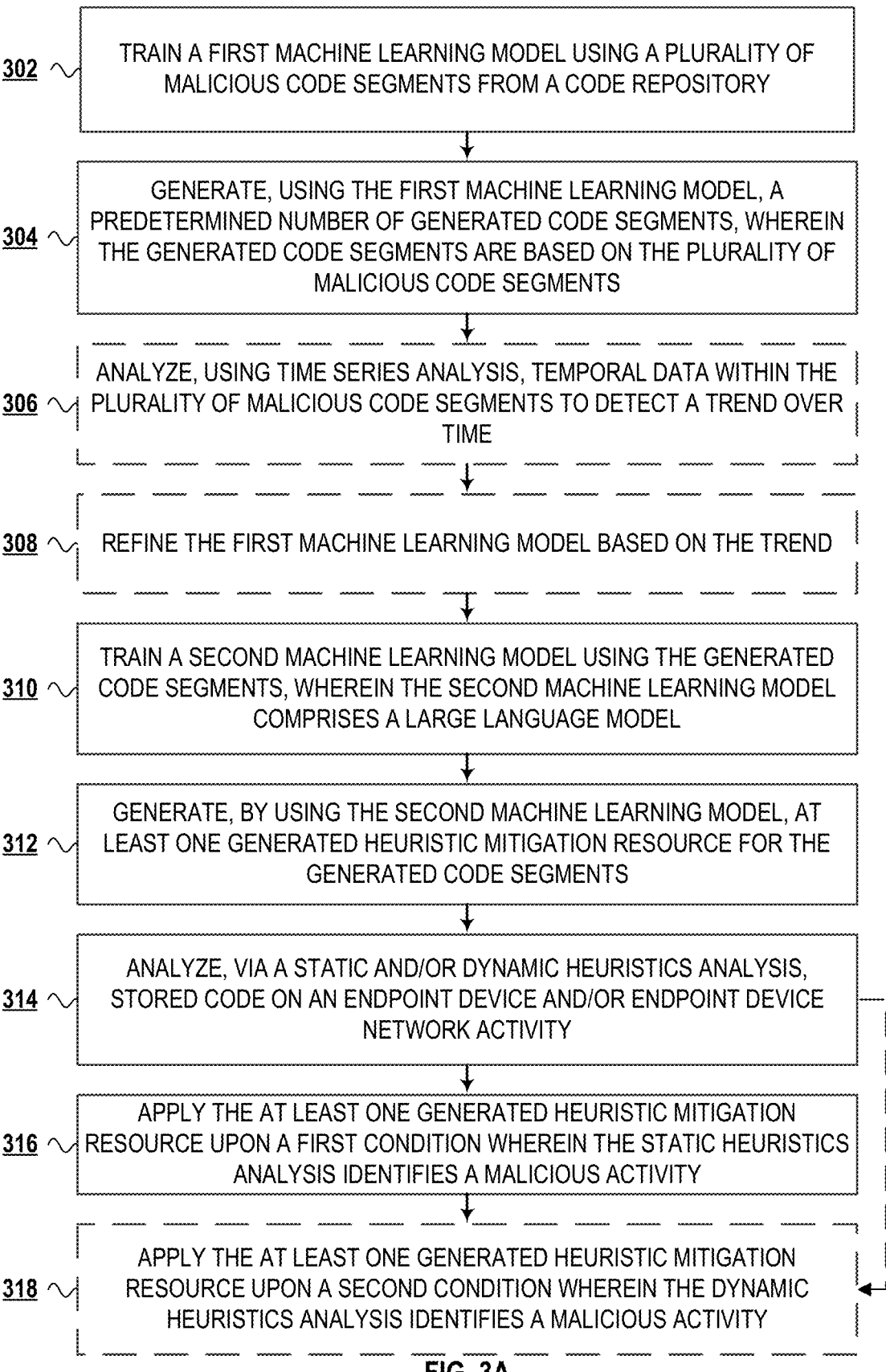

302 — TRAIN A FIRST MACHINE LEARNING MODEL USING A PLURALITY OF MALICIOUS CODE SEGMENTS FROM A CODE REPOSITORY

304 — GENERATE, USING THE FIRST MACHINE LEARNING MODEL, A PREDETERMINED NUMBER OF GENERATED CODE SEGMENTS, WHEREIN THE GENERATED CODE SEGMENTS ARE BASED ON THE PLURALITY OF MALICIOUS CODE SEGMENTS

306 — ANALYZE, USING TIME SERIES ANALYSIS, TEMPORAL DATA WITHIN THE PLURALITY OF MALICIOUS CODE SEGMENTS TO DETECT A TREND OVER TIME

308 — REFINE THE FIRST MACHINE LEARNING MODEL BASED ON THE TREND

310 — TRAIN A SECOND MACHINE LEARNING MODEL USING THE GENERATED CODE SEGMENTS, WHEREIN THE SECOND MACHINE LEARNING MODEL COMPRISES A LARGE LANGUAGE MODEL

312 — GENERATE, BY USING THE SECOND MACHINE LEARNING MODEL, AT LEAST ONE GENERATED HEURISTIC MITIGATION RESOURCE FOR THE GENERATED CODE SEGMENTS

314 — ANALYZE, VIA A STATIC AND/OR DYNAMIC HEURISTICS ANALYSIS, STORED CODE ON AN ENDPOINT DEVICE AND/OR ENDPOINT DEVICE NETWORK ACTIVITY

316 — APPLY THE AT LEAST ONE GENERATED HEURISTIC MITIGATION RESOURCE UPON A FIRST CONDITION WHEREIN THE STATIC HEURISTICS ANALYSIS IDENTIFIES A MALICIOUS ACTIVITY

318 — APPLY THE AT LEAST ONE GENERATED HEURISTIC MITIGATION RESOURCE UPON A SECOND CONDITION WHEREIN THE DYNAMIC HEURISTICS ANALYSIS IDENTIFIES A MALICIOUS ACTIVITY

FIG. 3A

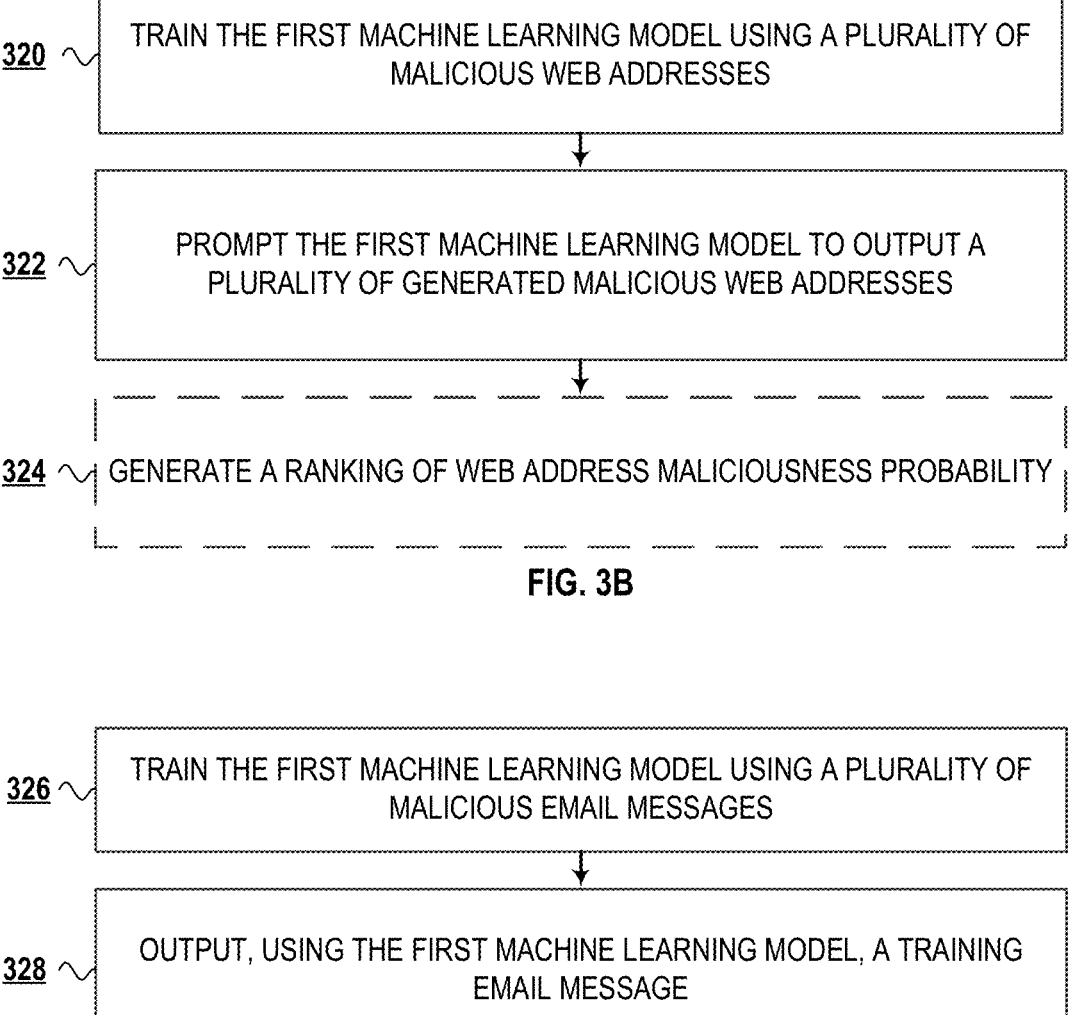

320 TRAIN THE FIRST MACHINE LEARNING MODEL USING A PLURALITY OF MALICIOUS WEB ADDRESSES

322 PROMPT THE FIRST MACHINE LEARNING MODEL TO OUTPUT A PLURALITY OF GENERATED MALICIOUS WEB ADDRESSES

324 GENERATE A RANKING OF WEB ADDRESS MALICIOUSNESS PROBABILITY

FIG. 3B

326 TRAIN THE FIRST MACHINE LEARNING MODEL USING A PLURALITY OF MALICIOUS EMAIL MESSAGES

328 OUTPUT, USING THE FIRST MACHINE LEARNING MODEL, A TRAINING EMAIL MESSAGE

FIG. 3C

SYSTEM AND METHOD FOR SYNTHETIC INTRUSION DATA GENERATION AND REMEDIATION VIA MACHINE LEARNING

TECHNOLOGICAL FIELD

Example implementations of the present disclosure relate to a system and method for synthetic intrusion data generation and remediation via machine learning.

BACKGROUND

Computing device intrusions, such as malware, are constantly evolving threats that adapt at a rapid pace. Traditional methods of reacting to and analyzing existing malware to develop countermeasures are often ineffective due to the speed at which new malware variants emerge. This reactive approach leaves entities vulnerable to attacks before effective countermeasures can be developed and deployed. Therefore, there is a critical need for a proactive approach to safeguarding systems against malware attacks, anticipating potential threats, and mitigating them before they can compromise an entity's systems.

BRIEF SUMMARY

Systems, methods, and computer program products are provided for synthetic intrusion data generation and remediation via machine learning.

In one aspect, a system for synthetic intrusion data generation and remediation via machine learning is presented. The system may include a processing device and a non-transitory storage device containing instructions, when executed by the processing device, the instructions cause the processing device to perform the steps of training a first machine learning model using a plurality of malicious code segments from a code repository, wherein the first machine learning model is a large language model, generating, using the first machine learning model, a predetermined number of generated code segments, wherein the generated code segments are based on the plurality of malicious code segments, training a second machine learning model using the generated code segments, wherein the second machine learning model may include a large language model, generating, by using the second machine learning model, at least one generated heuristic mitigation resource for the generated code segments, analyzing, via a static heuristics analysis, stored code on an endpoint device, and applying the at least one generated heuristic mitigation resource upon a first condition wherein the static heuristics analysis identifies a malicious activity.

In some implementations, the instructions may further cause the processing device to perform the steps of analyzing, using time series analysis, temporal data within the plurality of malicious code segments to detect a trend over time, and refining the first machine learning model based on the trend, wherein prompting the first machine learning model to output the predetermined number of the generated code segments may include prompting the first machine learning model to extrapolate the trend.

In some implementations, the instructions may further cause the processing device to perform the steps of training the first machine learning model using a plurality of malicious web addresses, and prompting the first machine learning model to output a plurality of generated malicious web addresses.

In some implementations, the instructions may further cause the processing device to perform the steps of generating a ranking of web address maliciousness probability.

In some implementations, the instructions may further cause the processing device to perform the steps of training the first machine learning model using a plurality of malicious email messages, and outputting, using the first machine learning model, a training email message.

In some implementations, the at least one generated heuristic mitigation resource is at least one selected from the group consisting of security definitions, software patches, and system configurations.

In some implementations, the instructions may further cause the processing device to perform the steps of analyzing, via a dynamic heuristics analysis, endpoint device network activity, and applying the at least one generated heuristic mitigation resource upon a second condition wherein the dynamic heuristics analysis identifies the malicious activity.

In another aspect, a computer program product for synthetic intrusion data generation and remediation via machine learning is presented. The computer program product may include a non-transitory computer-readable medium including code causing an apparatus to train a first machine learning model using a plurality of malicious code segments from a code repository, wherein the first machine learning model is a large language model, generate, using the first machine learning model, a predetermined number of generated code segments, wherein the generated code segments are based on the plurality of malicious code segments, train a second machine learning model using the generated code segments, wherein the second machine learning model may include a large language model, generate, by using the second machine learning model, at least one generated heuristic mitigation resource for the generated code segments, analyze, via a static heuristics analysis, stored code on an endpoint device, and apply the at least one generated heuristic mitigation resource upon a first condition wherein the static heuristics analysis identifies a malicious activity.

In some implementations, the code further causes the apparatus to analyze, using time series analysis, temporal data within the plurality of malicious code segments to detect a trend over time, and refine the first machine learning model based on the trend, wherein prompting the first machine learning model to output the predetermined number of the generated code segments may include prompting the first machine learning model to extrapolate the trend.

In some implementations, the code further causes the apparatus to train the first machine learning model using a plurality of malicious web addresses, and prompt the first machine learning model to output a plurality of generated malicious web addresses.

In some implementations, the code further causes the apparatus to generate a ranking of web address maliciousness probability.

In some implementations, the code further causes the apparatus to train the first machine learning model using a plurality of malicious email messages, and output, using the first machine learning model, a training email message.

In some implementations, the at least one generated heuristic mitigation resource is at least one selected from the group consisting of security definitions, software patches, and system configurations.

In some implementations, the code further causes the apparatus to analyze, via a dynamic heuristics analysis, endpoint device network activity, and apply the at least one generated heuristic mitigation resource upon a second condition wherein the dynamic heuristics analysis identifies the malicious activity.

In yet another aspect, a method for synthetic intrusion data generation and remediation via machine learning is presented. The method may include training a first machine learning model using a plurality of malicious code segments from a code repository, wherein the first machine learning model is a large language model, generating, using the first machine learning model, a predetermined number of generated code segments, wherein the generated code segments are based on the plurality of malicious code segments, training a second machine learning model using the generated code segments, wherein the second machine learning model may include a large language model, generating, by using the second machine learning model, at least one generated heuristic mitigation resource for the generated code segments, analyzing, via a static heuristics analysis, stored code on an endpoint device, and applying the at least one generated heuristic mitigation resource upon a first condition wherein the static heuristics analysis identifies a malicious activity.

In some implementations, the method may further include analyzing, using time series analysis, temporal data within the plurality of malicious code segments to detect a trend over time, and refining the first machine learning model based on the trend, wherein prompting the first machine learning model to output the predetermined number of the generated code segments may include prompting the first machine learning model to extrapolate the trend.

In some implementations, the method may further include training the first machine learning model using a plurality of malicious web addresses, and prompting the first machine learning model to output a plurality of generated malicious web addresses.

In some implementations, the method may further include generating a ranking of web address maliciousness probability.

In some implementations, the method may further include training the first machine learning model using a plurality of malicious email messages, and outputting, using the first machine learning model, a training email message.

In some implementations, the at least one generated heuristic mitigation resource is at least one selected from the group consisting of security definitions, software patches, and system configurations.

In some implementations, the method may further include analyzing, via a dynamic heuristics analysis, endpoint device network activity, and applying the at least one generated heuristic mitigation resource upon a second condition wherein the dynamic heuristics analysis identifies the malicious activity.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Having thus described implementations of the disclosure in general terms, reference will now be made the accompa- nying drawings. The components illustrated in the Figures may or may not be present in certain implementations described herein. Some implementations may include fewer (or more) components than those shown in the Figures.

Figure 1A:
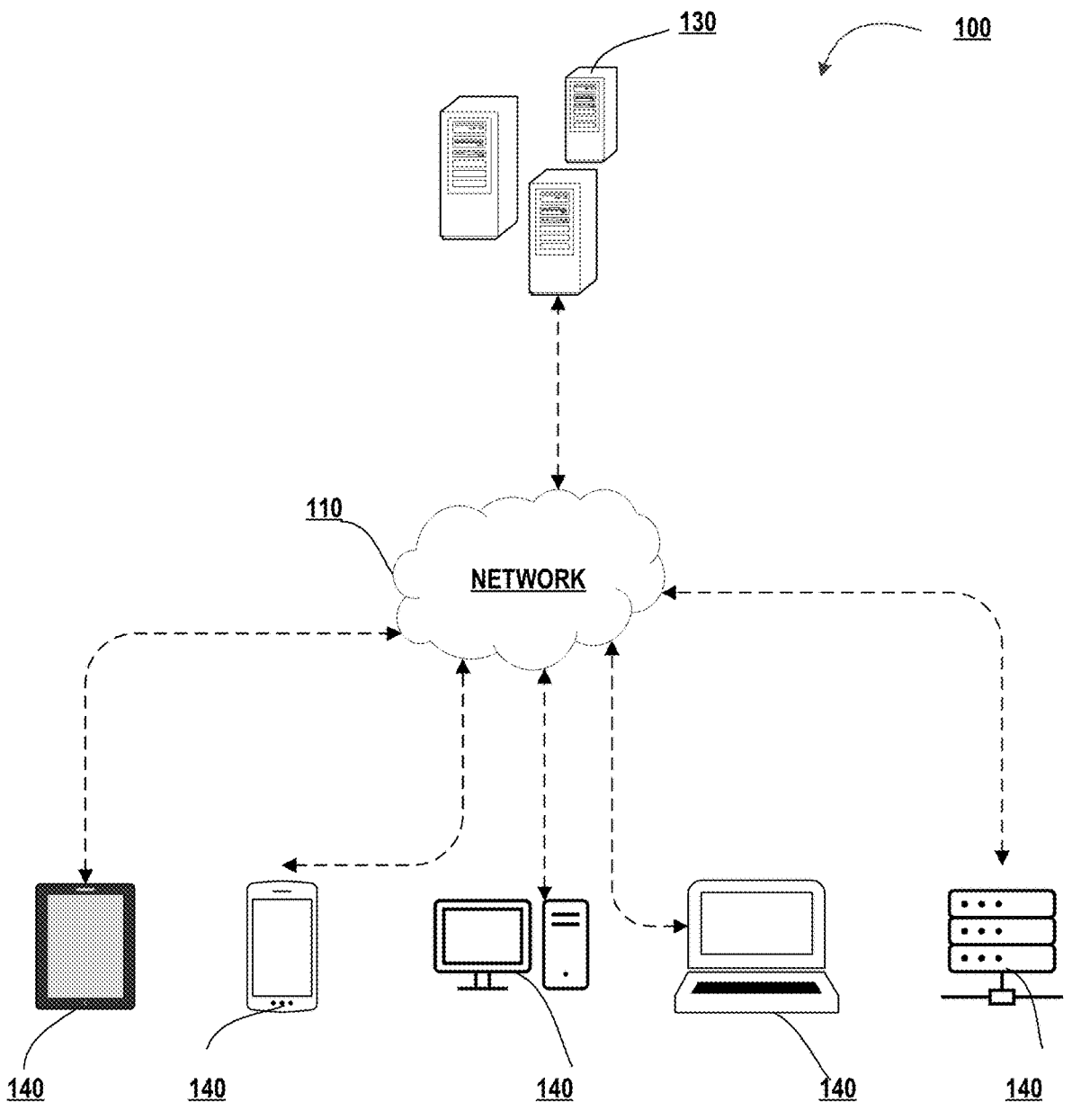
Figure 1B:
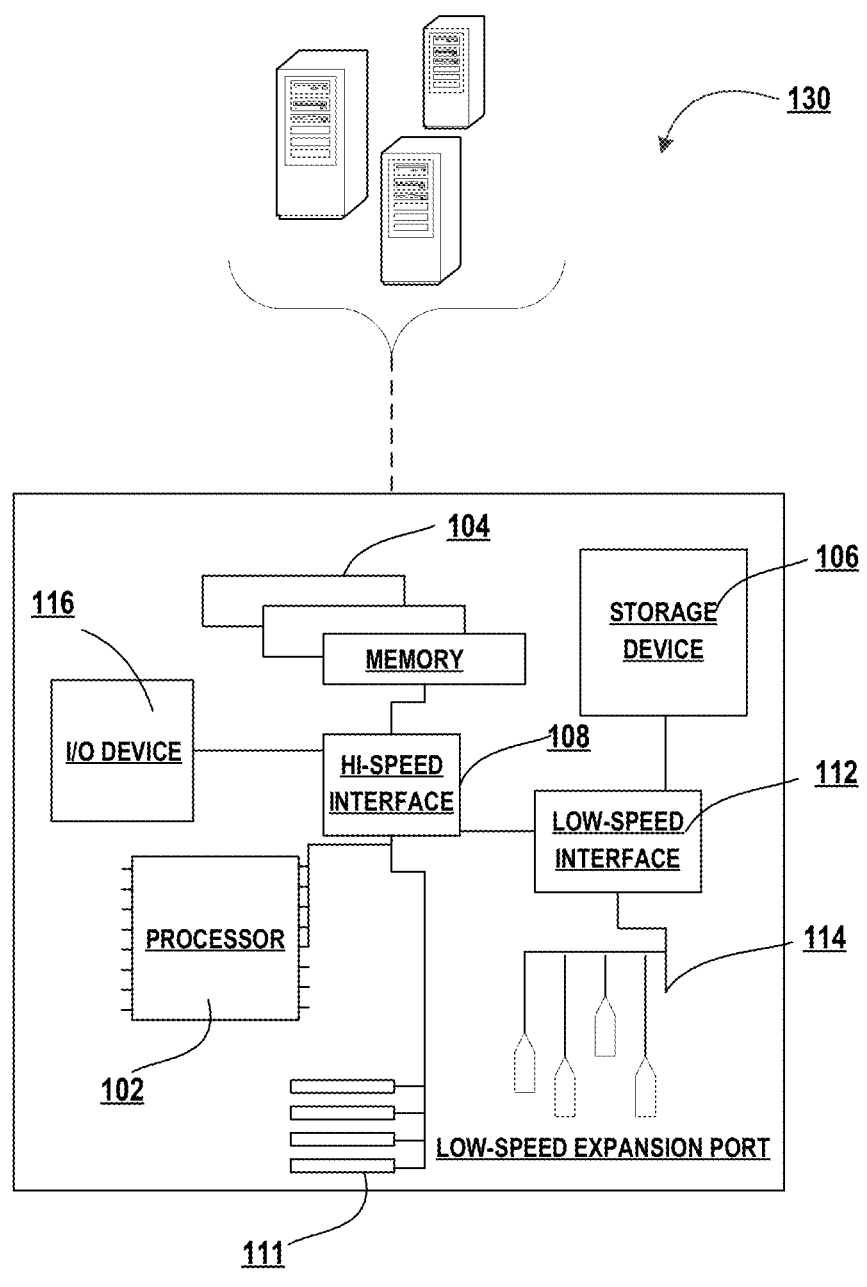
Figure 1C:
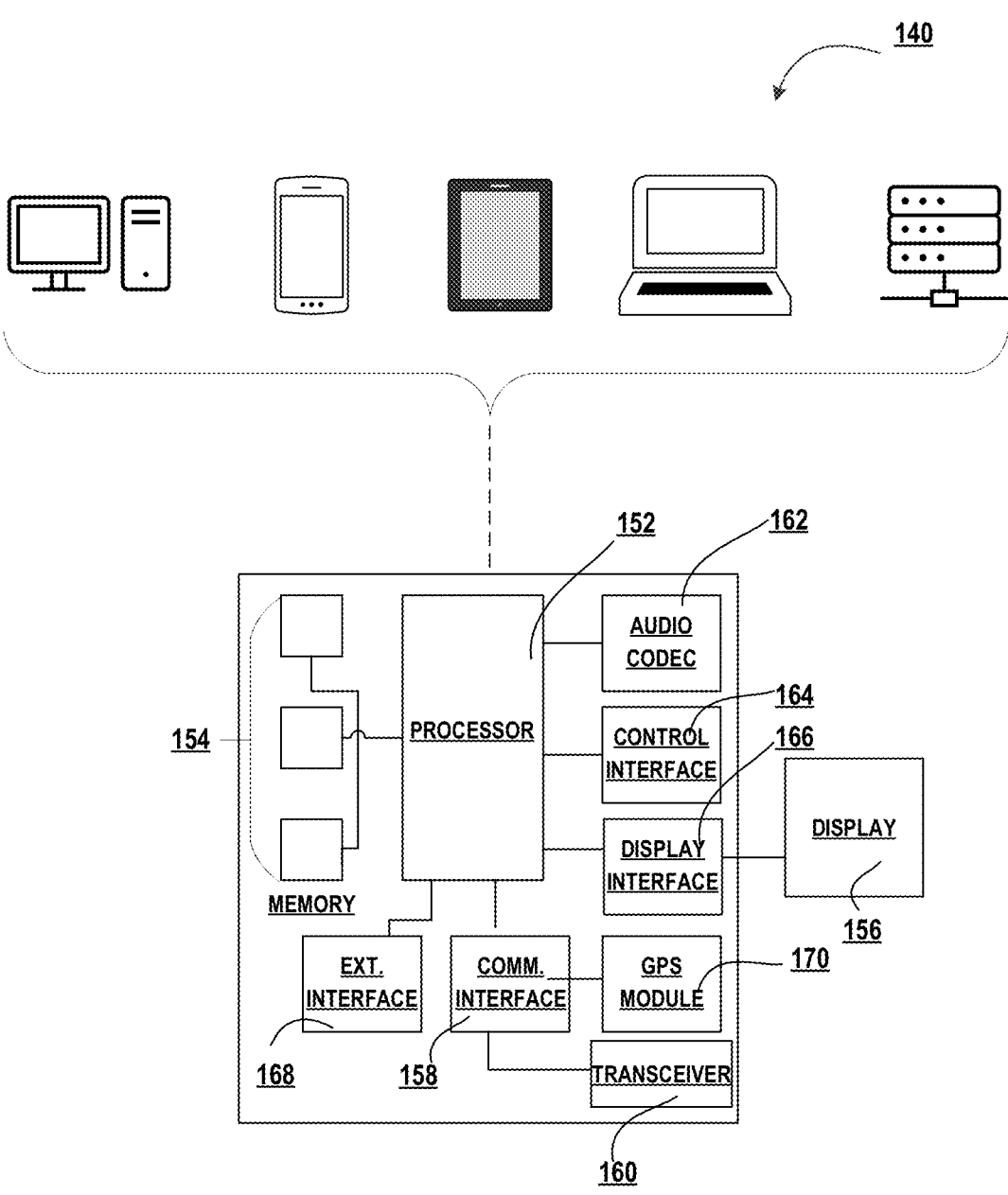
Figure 2:
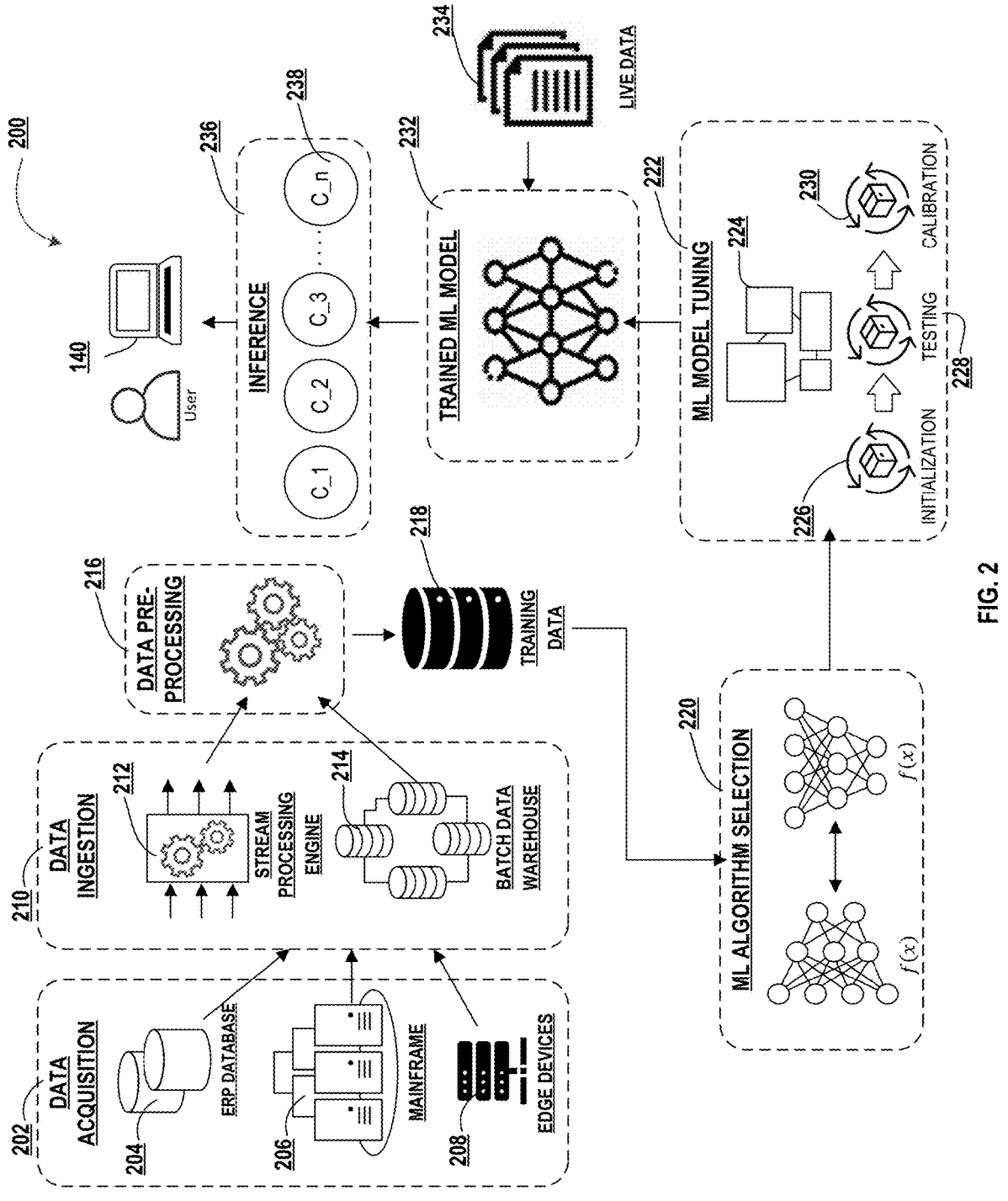

FIGS. 1A-1C illustrate technical components of an exemplary distributed computing environment for synthetic intrusion data generation and remediation via machine learning, in accordance with an implementation of the disclosure;

FIG. 2 illustrates an exemplary machine learning model subsystem architecture, in accordance with an implementation of the disclosure; and FIGS. 3A-3C illustrate a process flow for synthetic intrusion data generation and remediation via machine learning, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be implemented in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a "user interface" or "display" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some implementations, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that an element matches a predetermined criterion, including that a threshold has been met, passed, exceeded, and so on.

The technical problem solved herein relates to the persistent and rapidly evolving threat of endpoint device intrusions, specifically malware. Malware can abuse vulnerabilities in software and hardware, spread through networks, and execute malicious activities that compromise data integrity, system availability, and confidentiality. Current methodologies often rely only on post-intrusion analysis, where malware is identified and studied after it has been detected in the wild. This approach is inherently reactive. As malware evolves, these methods struggle to keep pace, resulting in a critical window of vulnerability during which systems remain unprotected.

Current solutions to this technical problem include antivirus software, intrusion detection systems, and endpoint protection platforms. Antivirus software typically relies on signature-based detection, which is effective only against known malware but fails to recognize new or polymorphic malware. IDS often depend on predefined rules and patterns to identify malicious activities, which can result in high false-positive rates and miss zero-day abuses. EPPs combine multiple security features but still rely heavily on identifying threats post-intrusion. These reactive measures are inadequate because they do not address the fundamental issue of preemptively identifying and mitigating potential threats before they penetrate an entity's systems. This gap in proactive defense mechanisms necessitates the development of more advanced techniques that can anticipate and counteract malware before it becomes a threat.

Addressing these challenges requires the establishment of a system and method for synthetic intrusion data generation and remediation via machine learning. Such a system provides for the ingestion of previously identified malicious code segments, malicious web addresses, and/or malicious email messages, and, based on this ingestion subject to machine learning, the generation of new malicious code segments, new malicious web addresses, and/or new malicious email messages (i.e., "synthetic intrusion data") used for remediation of intrusions not yet known or created by nefarious actors. In this way, intrusion attempts perpetrated by malware, spyware, viruses, or the like may be preemptively thwarted or otherwise detected prior to any damaging results thereof.

To do so, the system may use a machine learning engine that has been trained using data regarding up-to-date existing malware and other types of intrusion methods (e.g., credential appropriation attempts, vishing, and/or the like). Based on the training data, the machine learning engine may, via a large language model, generate new synthetic intrusion data that does not currently exist (i.e., the machine learning engine generates simulated 0-day attacks). The generated synthetic intrusion data may then be used as inputs to a machine learning-based remediation engine that may be configured to formulate defenses and/or remediation processes (e.g., security definitions, software updates or patches, system configurations, and/or the like) in response to the synthetic intrusion data. In this way, the system may create countermeasures to intrusion data that has not been created by malfeasant actors. In some implementations, the system may further use the existing malware and other types of intrusions to identify current trends in intrusion methods, that may in turn be used to fine-tune the generative machine learning engine, such that the machine learning engine may generate more relevant synthetic intrusion data. The machine learning engine may further be configured to generate other types of synthetic intrusion data. In this regard, the system may generate a list of synthetic web addresses, synthetic e-mail addresses, or synthetic email messages that may be potentially used in credential appropriation attempts, and subsequently generate a database of such synthetic web addresses or synthetic e-mail addresses that may be ranked based on the probability of being used in an intrusion, and/or generate synthetic email messages that may be used to train users to recognize the signs of an intrusion attempt.

What is more, the present disclosure provides a technical solution to a technical problem. As described herein, the technical problem includes the rapidly evolving threats of endpoint device intrusions, specifically malware that uses new techniques previously unknown, where current methodologies often rely only on post-intrusion analysis. Such an approach leaves endpoint devices vulnerable until a point in time when the intrusion is detected-often after damage has occurred or after sensitive information has been retrieved. The present disclosure embraces an improvement over existing solutions by allowing for the detection and remediation of intrusions (i) with fewer steps to achieve the solution (e.g., generating heuristic mitigation resources to defeat an intrusion attempt prior to the detection thereof, thus preventing the need for ongoing detection activities at a rate previously used), thus reducing the amount of network resources, such as processing resources, storage resources, network resources, and/or the like, that are being used, (ii) providing a more accurate solution to problem, thus reducing the number of resources required to remedy any errors made due to a less accurate solution (e.g., generating with relative ease a large number of synthetic intrusion data, thereby allowing for any one of the synthetic intrusion data to be closest in function or characteristics to that of an intrusion formulated by a malfeasant actor), (iii) removing manual input and waste from the implementation of the solution, thus improving speed and efficiency of the process and conserving network resources (e.g., preventing the necessity for humans to proactively predict the trends of intrusion data, and instead rely on machine learning methods to determine with high confidence the nature of intrusion data, by generation of synthetic intrusion data), (iv) determining an optimal amount of resources that need to be used to implement the solution, thus reducing network traffic and load on existing network resources (e.g., minimizing redundant intrusion detection efforts). In other words, the solution may bypass a series of steps previously implemented, thus further conserving network resources. Furthermore, the technical solution described herein uses a rigorous, computerized process to perform specific tasks and/or activities that were not previously performed.

FIGS. 1A-1C illustrate technical components of an exemplary distributed computing environment 100 for synthetic intrusion data generation and remediation via machine learning, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive service from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an implementation of the disclosure. As shown in FIG. 1B, the system 130 may include a processing device 102, memory 104, input/output (I/O) device 116, and a storage device 106. The system 130 may also include a high-speed interface 108 connecting to the memory 104, and a low-speed interface 112 connecting to a low-speed bus 114 and a storage device 106. Each of the components 102, 104, 108, 110, and 112 may be operatively coupled to one another using various buses and may be mounted on a common motherboard or in other manners as appropriate. As described herein, the processing device 102 may include a number of subsystems to execute the portions of processes described herein. Each subsystem may be a self-contained component of a larger system (e.g., system 130) and capable of being configured to execute specialized processes as part of the larger system.

The processing device 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processing devices, along with multiple memories, and/or I/O devices, to execute the processes described herein. In other words, as used herein, a "processing device" means one processing device (e.g., a microprocessor) that performs the defined functions or a plurality of processing devices (e.g., microprocessors) that collectively perform defined functions such that the execution of the individual defined functions may be divided amongst such processing devices.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described above. The information carrier may be a non-transitory computer- or machine-readable storage medium, such as the memory 104, the storage device 106, or memory on processing device 102.

The high-speed interface 108 manages bandwidth-intensive operations for the system 130, while the low-speed controller 112 manages lower bandwidth-intensive operations. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processing device 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processing device 152 is configured to execute instructions within the endpoint device(s) 140, including instructions stored in the memory 154, which in one implementation includes the instructions of an application that may perform the functions disclosed herein, including certain logic, data processing, and data storing functions. The processing device may be implemented as a chipset of chips that include separate and multiple analog and digital processors. The processing device may be configured to provide, for example, for coordination of the other components of the endpoint device(s) 140, such as control of user interfaces, applications run by endpoint device(s) 140, and wireless communication by endpoint device(s) 140.

The processing device 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processing device 152. In addition, an external interface 168 may be provided in communication with processing device 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly implemented in an information carrier. The computer program product contains instructions that, when executed, perform one or more methods, such as those described herein. The information carrier is a computer- or machine-readable medium, such as the memory 154, expansion memory, memory on processing device 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning model subsystem architecture 200, in accordance with an implementation of the disclosure. The machine learning subsystem 200 may include a data acquisition engine 202, data ingestion engine 210, data pre-processing engine 316, machine learning model tuning engine 222, and inference engine 236.

The data acquisition engine 202 may identify various internal and/or external data sources to generate, test, and/or integrate new features for training the machine learning model. These internal and/or external data sources 204, 206, and 208 may be initial locations where the data originates or where physical information is first digitized. The data acquisition engine 202 may identify the location of the data and describe connection characteristics for access and retrieval of data. In some implementations, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some implementations, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of network resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points. As will be understood in view of the present disclosure, training data 218 may additionally, or alternatively, be provided from a third party, having been generated as synthetic data.

The machine learning model tuning engine 222 may be used to train a machine learning model to form a trained machine learning model 232 using the training data 218 to make predictions or decisions without explicitly being programmed to do so. The machine learning model 232 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms can adjust their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the machine learning model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the machine learning model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It shall be understood that the implementation of the machine learning subsystem 200 illustrated in FIG. 2 is exemplary and that other implementations may vary. As another example, in some implementations, the machine learning subsystem 200 may include more, fewer, or different components.

FIGS. 3A-3C illustrate a process flow for synthetic intrusion data generation and remediation via machine learning, in accordance with an implementation of the disclosure. At block 302 the system 130 may train a first machine learning model (e.g., machine learning model 224 or trained machine learning model 232) using a plurality of malicious code segments from a code repository. It shall be appreciated that intrusion data may include malicious code segments, the malicious code segments being partial or whole segments of computer code designed to harm an endpoint device 140 (e.g., malware, spyware, or viruses). The malicious code segments may include computer code to self-replicate (e.g., a virus), may be written such as to extract data from the use of an endpoint device 140 and report such data to another entity or system (e.g., spyware), and/or integrate within an endpoint device 140 to maliciously alter the functionality thereof (e.g., malware).

The malicious code segments used to perpetrate intrusions may take numerous forms, with varieties of programming languages, techniques, targets, and so forth. Indeed, new malicious code segments are often written by malfeasant actors at a rapid rate, quick enough to subvert traditional detection programs due to their novel structures, techniques, and characteristics. To attempt to detect these intrusions, entities and/or vendors of intrusion detection software may maintain databases containing existing malicious code segments (i.e., malicious code segments that have been previously created by malfeasant actors and have since been detected as being malicious).

These malicious code segments may be provided to a machine learning model, and specifically a large language model ("LLM"), as training data. At this stage, the large language model may engage in unsupervised learning, meaning it processes the malicious code segment datasets fed to it without specific instructions. During this process, the LLM's "learns" the meaning of malicious code segment "programming constructs" (e.g., programming language functions, variables, syntax, or the like) and of the relationships between the elements of the programming constructs and distinguishes based on context. The LLM may undergo fine-tuning and/or prompt-tuning to improve the accuracy of generated outputs. Indeed, since the first machine learning model may be a "generative AI" (e.g., a large language model), prompts provided to the first machine learning model may allow for the first machine learning model to generate malicious code segments differentiated from those provided as training data.

Indeed, at block 304, the system 130 may generate, using the first machine learning model, a predetermined number of generated code segments. In some implementations, a prompt may be provided to the first machine learning model that includes a directive to generate a certain number of generated code segments (i.e., generated malicious code segments). This number, having been predetermined, may be one generated code segment (e.g., a malware script), or a plurality of generated code segments (e.g., numerous variations of malware scripts).

In some implementations, the prompt may be provided to the first machine learning model as a result of an initiation action, for example through a button of a user interface. In other implementations, the prompt may be provided to the first machine learning model as text into a text box of an interface operatively coupled to the first machine learning model. In yet additional implementations, the first machine learning model may be prompted automatically, for example on a recurring basis (e.g., once per hour, once per day, once per week, once per month, and so forth).

As a result of the nature of the large language model, the generated code segments may generally be based on the malicious code segments provided to the first machine learning model for training purposes. For example, the probability of a particular function or variable to be generated next in a sequence while generating the generated malicious code segment may be determined by probability analysis based on the context and pattern recognition, as is performed by the machine learning model.

In some implementations, the process may continue at block 306, where the first machine learning model of the system 130 may analyze, using time series analysis, temporal data within the plurality of malicious code segments to detect a trend over time. It shall be appreciated that malicious code segments may be accompanied by temporal data or metadata, such as the creation date of the malicious code segment, the date on which the malicious code segment was first discovered or detected, the date on which a mitigation resource was first created to address the malicious code segment, and so forth.

As such, this temporal data may be provided to the first machine learning model (or a separate and distinct machine learning model), to understand the time-based trends of programming constructs for the malicious code segments provided for training. To do so, time series analysis may be performed by the first machine learning model, (or a separate and distinct machine learning model) the time series analysis including at least one of data preprocessing to covert the malicious code segments into a suitable format, feature extraction and creation of time-based features, division of malicious code segments into training, validation, and test sets while keeping the temporal order, training of the first machine learning model, and hyperparameter tuning such as grid search, random search, or Bayesian optimization. The time-based inferences made by the first machine learning model may be hereafter referred to as a "trend."

A trend may be simply the likelihood that a particular programming language is implemented in a malicious code segment, provided that a new type of programming language has recently been shown to have an increase in occurrences. Additionally, or alternatively, the trend may refer to programming styles, and how the programming styles have changed over time for malicious code segments. For example, object-oriented programming may be a popular programming style for malicious code segments, but on a temporal basis, functional programming use may have increased recently. Additionally, or alternatively, the frequency of use of functions and/or variables may have time-based trends.

In some implementations, the process may continue at block 308, where the system 130 may refine the first machine learning model based on the trend. Indeed, the first machine learning model may be trained, tuned, and/or or prompted to place a higher emphasis (e.g., probabilistic weight) on the most recent malicious code segments, such as to predict the programming constructs a particular function or variable to be generated next in a sequence of a malicious code segment being generated.

In this way, when the first machine learning model is prompted to output the predetermined number of the generated code segments, the first machine learning model extrapolates the trend (i.e., generates the generated code segments based on the prediction of the next object in the sequence based on a trend). In some implementations, the prompt to the first machine learning model may be specific in that a specific trend is desired to be seen in the generated code segments. For example, the prompt may include language that indicates that the generated code segments should be a certain programming language, but the generated code segments should include functions and variables used in that programming language based on the trends known by the first machine learning model within that programming language. Additionally, or alternatively, the prompt may include language that indicates that the generated code segments should emphasize current trends in intrusion technique, such as browser hijacking, backdoors, privilege escalation, or the like.

Continuing at block 310, the system 130 may train a second machine learning model using the generated code segments. The second machine learning model may include a large language model. The training of the second machine learning model may include providing the generated code segments to the second machine learning model, while also providing heuristic mitigation resources for at least a portion of the generated code segments as training data. The heuristic mitigation resource(s) may be security definition(s), software patche(s), and/or endpoint device system configuration(s) used to remediate an intrusion that is executed or enabled by a generated code segment(s) when the generated code segment(s) is (are) present within an endpoint device. A heuristic mitigation resource may be generated (either by a third machine learning model trained on heuristic mitigation resources, manually, or the like) and provided as training data alongside a generated code segment. In some implementations, the system 130 may execute a generated code segment and subsequently implement the heuristic mitigation resource to determine that the heuristic mitigation resource is effective.

Additionally, or alternatively, in some implementations the training of the second machine learning model may include providing the malicious code segments (i.e., in addition to, or instead of, the generated code segments) to the second machine learning model, while also providing heuristic mitigation resources for at least a portion of the malicious code segments as training data. The heuristic mitigation resource(s) may be security definition(s), software patche(s), and/or endpoint device system configuration(s) used to remediate an intrusion that is executed or enabled by the malicious code segment(s) when the malicious code segment(s) is (are) present within an endpoint device 140. In some implementations, heuristic mitigation resource(s) are readily available for the malicious code segments in a database alongside their corresponding malicious code segment(s). Additionally, or alternatively, a heuristic mitigation resource may be generated (either by a third machine learning model trained on heuristic mitigation resources, manually, or the like) and provided as training data alongside a malicious code segment. In some implementations, the system 130 may execute a malicious code segment and subsequently implement the heuristic mitigation resource to determine that the heuristic mitigation resource is effective.

Next, at block 312, once trained on several heuristic mitigation resources and their corresponding generated code segments, the second machine learning model may be prompted to generate at least one generated heuristic mitigation resource for the generated code segments. In other words, security definitions, software patches, and/or endpoint device system configurations may be generated for all the available generated code segments, or a predetermined number of the generated code segments. In some implementations, each generated code segment may correspond to a predetermined number of generated heuristic mitigation resources, such that multiple generated heuristic mitigation resources are available in the case that one or more are unsuccessful.

The prompt to generate the generated heuristic mitigation resources may include requests for certain categories of generated heuristic mitigation resources only, or a mixture of categories. For example, only software patches may be requested.

In some implementations, the at least one generated heuristic mitigation resource may be stored in a heuristic database alongside its corresponding generated code segments for use in later processes described herein.

At block 314, the system 130 may analyze, via a static heuristics analysis, stored code on an endpoint device 140. Indeed, an endpoint device 140 (i.e., a computing device) may contain computer code stored in memory device(s) or storage device(s). On an endpoint device 140, stored code may consist of the operating system, application software, drivers, and/or firmware. The operating system code manages hardware and software resources and may reside in the endpoint device's primary storage, such as a hard drive or SSD. Application software, which provides user functionality, may be stored in the same primary storage and may be loaded into RAM when executed. Drivers, which facilitate communication between the operating system and hardware peripherals, may be stored similarly to application software. Firmware, which may be a low-level code embedded in hardware components like BIOS or device controllers, may be stored in non-volatile memory such as EEPROM or flash memory.

In static heuristic analysis, the system 130 may examine the stored code without executing it. To prepare for such analysis, in some implementations the system 130 may decompile application software to examine its stored code. Regardless, the stored code (e.g., decompiled code) may be compared to the generated code segments stored in the heuristic database. In some implementations, a predetermined threshold may be set, such that if a predetermined percentage of the stored code matches with a portion of at least one of the generated code segments stored in the heuristic database, the stored code may be flagged as a threat. For example, a predetermined percentage of 50% may be set, such that if 50% or more of a stored code matches any one or more generated code segments in the heuristic database, the stored code is flagged.

Additionally, or alternatively, the system 130 may analyze endpoint device 140 network activity via a dynamic heuristics analysis. Unlike static heuristic analysis, which analyzes pre-existing code that is stored, dynamic heuristics analysis may be implemented by using a virtual machine as a "sandbox" to observe behavior of the endpoint device 140. While dynamic heuristic analysis is being performed, for example during the execution of stored code or an application within a virtual machine or similar sandbox, the system 130 may be monitoring the behavior patterns of the virtual machine or computing device to determine anomalous behavior patterns and/or system operations and/or network activity. The anomalous behavior patterns and/or system operations and/or network activity may include CPU usage, memory usage, irregular read/write operations, unexpected network traffic, file system changes, or the like, and predetermined thresholds or unaltered file system folders may be set for any of the foregoing parameters to compare to the behavior occurring as the result of the execution of the stored code or application(s). Similarly, approved lists of network communication IP addresses, ports, or domains for communication may be predetermined such that any network traffic outside of those predetermined network communication IP addresses, ports, or domains may be deemed anomalous.

Next, at block 316, the system 130 may apply the at least one generated heuristic mitigation resource upon a first condition wherein the static heuristics analysis identifies a malicious activity. If, after the analysis of static heuristic analysis at block 314, the system 130 has determined there to be a malicious activity (e.g., the presence of stored code on the endpoint device 140 that matches a portion of, or the entirety of, a generated code segment), the system 130 will then automatically apply one or more generated heuristic mitigation resources (e.g., security definition(s), software patche(s), and/or endpoint device system configuration(s)). For example, if a particular stored code on the endpoint device 140 is a 51% match with a generated code segment, and the predetermined percentage threshold is 50%, then the system 130 may apply a software patch that was generated by the second machine learning model, found in the heuristic database and associated with the generated code segment that contains the 51% match with the stored code.

Additionally, or alternatively, in implementations where dynamic heuristics analysis is used, the system 130 at block 318 may apply the at least one generated heuristic mitigation resource upon a second condition wherein the dynamic heuristics analysis identifies the malicious activity. Once the system 130 has determined malicious activity as a result of the dynamic heuristics analysis, the source of such malicious activity may be determined. To do so, the system 130 may trace calls to originating processes, associate network activity with specific processes using network connection logs and/or source/destination IP addresses, analyze various log entries generated by applications, and/or determine the process(es) resulting in read/write operations that modify a file. Additionally, or alternatively, the system 130 may execute a command to run a predetermined application or a stored code while in the virtual environment, and therefore already have record of the application or stored code that caused the malicious activity (i.e., the anomalous behavior pattern).

If, after the dynamic heuristic analysis, the system 130 has determined there to be a malicious activity, the system 130 will then automatically apply one or more generated heuristic mitigation resources (e.g., security definition(s), software patche(s), and/or endpoint device system configuration(s)). In some implementations, the system 130 may compare the stored code or application to the generated code segments and apply the one or more generated heuristic mitigations resources associated with one or more generated code segments that matches the stored code or code of the application above a predetermined threshold.

Referring now to block 320 of FIG. 3B, in some implementations the code further causes the apparatus to train the first machine learning model using a plurality of malicious web addresses. Although the first machine learning model may be trained using a malicious code that is known to be malicious, additionally, or alternatively, the first machine learning model may be trained using web addresses known to be malicious. A malicious web address database may be maintained that includes web addresses reported or otherwise known to be malicious, the malicious behavior of such websites including appropriation of sensitive information, distribution of malware, automatic downloading of malicious code, cryptojacking, data harvesting, or the like.

Often, malicious web addresses share common features that differentiate their web addresses from those that resolve to legitimate and safe websites. For example, generic top-level domains ("gTLD") or country-code top-level domains ("ccTLD"), or the like, may be more obscure and have a higher probability of malicious activity. For example, only a small fraction of ".com" ".net" and ".org" domains may resolve to malicious websites, but a slightly higher percentage of ".ru", ".cn", and ".kp" domains may result in such activity.

Similarly, patterns in subdomains may be seen, such that the "www" subdomain tends to resolve to websites with less likelihood of malicious activity than the "store" subdomain. Regarding the domain name itself, patterns may similarly be seen. For example, domains that include only properly spelled words from a dictionary tend to resolve to websites with less likelihood of malicious activity than domains that include misspelled words or random combinations of alphanumeric characters. Moreover, domains that are longer in length may tend to resolve to websites with less likelihood of malicious activity than domains that are shorter in length. Indeed, many such patterns may inform a machine learning model as to the propensity of a particular web address to lead to a website that poses a threat to the endpoint device 140 navigating thereto. By training a machine learning model on such web addresses, as well as web addresses that are deemed "safe", overall trends and probability determinations of similarly threatening web addresses may be ascertained.

Continuing at block 322, the system 130 may prompt the first machine learning model to output a plurality of generated malicious web addresses. Since the first machine learning model may be a large language model with generative abilities, this first machine learning model, having been trained on malicious web addresses, may generate web addresses similar to those on which it was trained. As such, the first machine learning model may be prompted to generate a predetermined number of web addresses that are representative of web addresses most likely to be malicious.

At block 324, the system 130 may generate a ranking of web address maliciousness probability. In some implementations, the probability of web address maliciousness of those web addresses generated in block 322 may be ranked on a scale based on the number of web addresses generated (e.g., from 1 to 10, if 10 web addresses were generated). In other implementations, the ranking may be a numerical value on a predetermined scale, such as from 1 to 10, 1 to 100, and so forth.

To do so, distance-based methods may be implemented by the machine learning model (to detect web addresses that are outliers) which evaluates the distances between data points representing the website addresses, and based on distance, a score (e.g., probability) is assigned. As one example, in K-Nearest Neighbors (KNN) method, the average distance to the k-nearest neighbors is calculated, with higher distances to the data points representing "safe" web addresses indicating web addresses with a higher chance of being malicious. Clustering methods, such as DBSCAN and k-means, may measure the distance of a point to its cluster centroid, where larger distances indicate a higher chance of a web address being malicious. A score can be generated by normalizing these distances and assigning higher scores to points (on a predetermined scale) with greater distances from their neighbors or centroids.

Additionally, or alternatively, density-based methods may be implemented, such as Local Outlier Factor (LOF), to assess the local density of a point compared to its neighbors. Points with significantly lower local density may be flagged as indicating a higher chance of a web address being malicious. The LOF algorithm generates a score by comparing the local density of a point to the densities of its neighbors (e.g., the neighbors being "safe" web addresses), with higher scores (on a predetermined scale) indicating stronger likelihood of a web address being malicious. Similarly, an Isolation Forest algorithm may isolate data points and assign higher scores to points that are isolated quickly, suggesting they are outliers, by determining the number of partitions required to isolate a point, with fewer partitions resulting in higher scores.

In this way, a ranked list of potentially malicious websites is generated, which may be stored in a malicious web address database and used in detection and prevention of communication with such websites, even if the web address has not yet been registered or used. For example, the system 130 may create a list of web addresses that will be blocked upon an attempt to access any of said web addresses. Additionally, or alternatively, the malicious web address database may be used during dynamic heuristic analysis of block 314 to flag any code or applications that attempt to communicate with any web addresses in the malicious web address database.

In some implementations, the system 130 may determine if a web address is an intrusion event by comparing scores of a web address to a predetermined threshold. A predetermined threshold may be set to indicate that scores (i.e., rankings) over the predetermined threshold are significant (i.e., inferred to be an intrusion event not authorized by any authorized user), and may require further action or notification. For example, if the KNN clustering method is used for scoring (i.e., finding distances between points), a maximum distance may be set as a predetermined threshold such that distances below the predetermined threshold are ignored or otherwise not determined to be intrusion events.

Referring now to block 326 of FIG. 3C, in some implementations, the system 130 may train the first machine learning model using a plurality of malicious email messages. Although the first machine learning model may be trained using a malicious code that is known to be malicious, and/or malicious web addresses, additionally, or alternatively, the first machine learning model may be trained using email messages known to be malicious. Malicious email messages may contain links to web addresses reported or otherwise known to be malicious (or as generated malicious web addresses through the processes described herein with respect in FIG. 3B). Additionally, or alternatively, malicious email messages may contain malicious attachments that contain malicious code segments (or as generated code segments through the processes described herein with respect to FIG. 3A).

Often, malicious email messages share common features that differentiate their contents from those that are legitimate and "safe." For example, sender email addresses that contain certain domains may be more obscure and have a higher probability of malicious activity. For example, only a small fraction of email messages from senders having a ".com" ".net" and ".org" domain in their sender email address may be malicious, but a slightly higher percentage of email messages from senders having a ".ru", ".cn", and ".kp" domain in their sender email address may be malicious. Similarly, email messages from senders having sender email address domains that include only properly spelled words from a dictionary have a lower likelihood of malicious activity than email messages from senders having sender email address domains with misspelled words or random combinations of alphanumeric characters. Moreover, compared to email messages with traditional hyperlinks, there is a higher likelihood of malicious activity in an email message that contains a hyperlink that purports to be a web address differently than that to which is resolved upon selection of the hyperlink.

By training a machine learning model on such email messages, as well as email messages that are deemed "safe", overall trends and probability determinations of similarly threatening email messages may be ascertained.

Continuing at block 328, the system 130 may output, using the first machine learning model, one or more training email messages. Since the first machine learning model may provide generative capabilities, this first machine learning model, having been trained on malicious email messages, may generate email messages similar to those on which it was trained. As such, the first machine learning model may be prompted to generate a predetermined number of email messages that are representative of email messages most likely to be malicious. In doing so, these email messages that are generated may be used as training email messages for purposes of training employees or other stakeholders within an entity, and therefore allow for continuing education and awareness as to the most up-to-date malicious email message tactics perpetuated by malfeasant actors.

In some implementations, a static heuristic analysis of incoming emails into an endpoint device 140 may be performed. The training email messages generated by the first machine learning model may be stored in a database, in some embodiments alongside known malicious email messages. The stored training email messages may be compared to incoming email messages prior to, or after, being received in an email inbox. In some implementations, a predetermined threshold may be set, such that if a predetermined percentage of an incoming email message matches with a portion of training email messages and/or known malicious email messages stored in the database, the incoming email may be flagged as a threat. For example, a predetermined percentage of 50% may be set, such that if 50% or more of an incoming email matches any training email messages and/or known malicious email messages stored in the database, the incoming email message is flagged, deleted, and/or quarantined.

To integrate each of the foregoing analyses, it shall be appreciated that a user of an endpoint device 140 may desire to receive an indication that either (i) the endpoint device 140 may contain malicious code segments, (ii) the endpoint device 140 may be communicating with a malicious web address, and/or (iii) the endpoint device 140 may be receiving a malicious email message. Accordingly, the system 130 may transmit a notification signal including intrusion event details (e.g., communicating whether there may be malicious code segments, malicious web address, and/or malicious email message) to the first endpoint device 140 associated with a first user. This "first notification signal" may be sent using a pre-determined communication protocol, and through a wireless network, a wired connection, or an internet-based platform, depending on the infrastructure in place. In some implementations, the first notification signal may trigger a notification alert to capture the first user's attention. To this end, the first notification signal (or the notification alert triggered by the notification signal) may include data for display of a splash banner, and the system 130 may display the splash banner on a first endpoint device 140 associated with the first user. The notification signal may also include instructions for how to defeat the suspected intrusion event and allow for continued use of the first endpoint device 140. For example, an additional layer of authentication credentials may be queried by the first endpoint device 140 such as to ensure that the user of the first endpoint device 140 is an authorized user. Additionally, or alternatively, the notification signal may lock or freeze the first endpoint device 140 from further use and require override to the locking of the first endpoint device 140 by an employee of the entity.

Additionally, or alternatively, the system 130 may transmit a notification signal to a second endpoint device (i.e., a "second notification signal"). For example, a second endpoint device may be monitored by an employee of the entity (i.e., a "second user"), and therefore a notification may be generated to alert the employee of the entity that the first endpoint device intrusion event. The second notification signal may similarly include an indication that either (i) the first endpoint device 140 may contain malicious code segments, (ii) the first endpoint device 140 may be communicating with a malicious web address, and/or (iii) the first endpoint device 140 may be receiving a malicious email message. In some implementations, the second notification signal may include contact information for the first user, or a predetermined authorized user of the first endpoint device 140, such as to facilitate the communication to such user that an intrusion event has occurred.

As will be appreciated by one of ordinary skill in the art, the present disclosure may be implemented as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for synthetic intrusion data generation and remediation via machine learning, the system comprising:
a processing device; and
a non-transitory storage device containing instructions, when executed by the processing device, the instructions cause the processing device to perform the steps of:
training a first machine learning model using a plurality of malicious code segments from a code repository, wherein the first machine learning model is a large language model;
generating, using the first machine learning model, a predetermined number of generated code segments, wherein the generated code segments are based on the plurality of malicious code segments;
training a second machine learning model using the generated code segments, wherein the second machine learning model comprises a large language model;
generating, by using the second machine learning model, at least one generated heuristic mitigation resource for the generated code segments;
analyzing, via a static heuristics analysis, stored code on an endpoint device; and
applying the at least one generated heuristic mitigation resource upon a first condition wherein the static heuristics analysis identifies a malicious activity.

2. The system of claim 1, wherein the instructions further cause the processing device to perform the steps of:
analyzing, using time series analysis, temporal data within the plurality of malicious code segments to detect a trend over time; and
refining the first machine learning model based on the trend;
wherein generating, using the first machine learning model, the predetermined number of the generated code segments comprises prompting the first machine learning model to extrapolate the trend.

3. The system of claim 2, wherein the instructions further cause the processing device to perform the steps of:
training the first machine learning model using a plurality of malicious web addresses; and
prompting the first machine learning model to output a plurality of generated malicious web addresses.

4. The system of claim 3, wherein the instructions further cause the processing device to perform the steps of:
generating a ranking of web address maliciousness probability.

5. The system of claim 1, wherein the instructions further cause the processing device to perform the steps of:
training the first machine learning model using a plurality of malicious email messages; and
outputting, using the first machine learning model, a training email message.

6. The system of claim 1, wherein the at least one generated heuristic mitigation resource is at least one selected from the group consisting of security definitions, software patches, and system configurations.

7. The system of claim 1, wherein the instructions further cause the processing device to perform the steps of:

US 12,568,104 B2

25 analyzing, via a dynamic heuristics analysis, endpoint device network activity; and applying the at least one generated heuristic mitigation resource upon a second condition wherein the dynamic heuristics analysis identifies the malicious activity.

8. A computer program product for synthetic intrusion data generation and remediation via machine learning, the computer program product comprising a non-transitory computer-readable medium comprising code causing an apparatus to:

train a first machine learning model using a plurality of malicious code segments from a code repository, wherein the first machine learning model is a large language model;

generate, using the first machine learning model, a predetermined number of generated code segments, wherein the generated code segments are based on the plurality of malicious code segments;

train a second machine learning model using the generated code segments, wherein the second machine learning model comprises a large language model;

generate, by using the second machine learning model, at least one generated heuristic mitigation resource for the generated code segments;

analyze, via a static heuristics analysis, stored code on an endpoint device; and apply the at least one generated heuristic mitigation resource upon a first condition wherein the static heuristics analysis identifies a malicious activity.

9. The computer program product of claim 8, wherein the code further causes the apparatus to:

analyze, using time series analysis, temporal data within the plurality of malicious code segments to detect a trend over time; and refine the first machine learning model based on the trend;

wherein generating, using the first machine learning model, the predetermined number of the generated code segments comprises prompting the first machine learning model to extrapolate the trend.

10. The computer program product of claim 9, wherein the code further causes the apparatus to:

train the first machine learning model using a plurality of malicious web addresses; and prompt the first machine learning model to output a plurality of generated malicious web addresses.

11. The computer program product of claim 10, wherein the code further causes the apparatus to:

generate a ranking of web address maliciousness probability.

12. The computer program product of claim 8, wherein the code further causes the apparatus to:

train the first machine learning model using a plurality of malicious email messages; and output, using the first machine learning model, a training email message.

13. The computer program product of claim 8, wherein the at least one generated heuristic mitigation resource is at least one selected from the group consisting of security definitions, software patches, and system configurations.

14. The computer program product of claim 8, wherein the code further causes the apparatus to:

analyze, via a dynamic heuristics analysis, endpoint device network activity; and apply the at least one generated heuristic mitigation resource upon a second condition wherein the dynamic heuristics analysis identifies the malicious activity.

15. A method for synthetic intrusion data generation and remediation via machine learning, the method comprising:

training a first machine learning model using a plurality of malicious code segments from a code repository, wherein the first machine learning model is a large language model;

generating, using the first machine learning model, a predetermined number of generated code segments, wherein the generated code segments are based on the plurality of malicious code segments;

training a second machine learning model using the generated code segments, wherein the second machine learning model comprises a large language model;

generating, by using the second machine learning model, at least one generated heuristic mitigation resource for the generated code segments;

analyzing, via a static heuristics analysis, stored code on an endpoint device; and applying the at least one generated heuristic mitigation resource upon a first condition wherein the static heuristics analysis identifies a malicious activity.

16. The method of claim 15, wherein the method further comprises:

analyzing, using time series analysis, temporal data within the plurality of malicious code segments to detect a trend over time; and refining the first machine learning model based on the trend;

wherein generating, using the first machine learning model, the predetermined number of the generated code segments comprises prompting the first machine learning model to extrapolate the trend.

17. The method of claim 16, wherein the method further comprises:

training the first machine learning model using a plurality of malicious web addresses; and prompting the first machine learning model to output a plurality of generated malicious web addresses.

18. The method of claim 17, wherein the method further comprises:

generating a ranking of web address maliciousness probability.

19. The method of claim 15, wherein the method further comprises:

training the first machine learning model using a plurality of malicious email messages; and outputting, using the first machine learning model, a training email message.

20. The method of claim 15, wherein the at least one generated heuristic mitigation resource is at least one selected from the group consisting of security definitions, software patches, and system configurations.

* * * * *